United States Patent [19]
Shuen

[11] Patent Number: 5,638,623
[45] Date of Patent: Jun. 17, 1997

[54] REPLACEABLE LICENSE PLATE FRAME STRUCTURE

[75] Inventor: Shun-Tian Shuen, Son Chung, Taiwan

[73] Assignee: Janchy Enterprise Co., Ltd., Taipei, Taiwan

[21] Appl. No.: 628,760

[22] Filed: Apr. 5, 1996

[51] Int. Cl.⁶ .................................................... G09F 7/00
[52] U.S. Cl. .................................................... 40/209; 40/732
[58] Field of Search ............................ 40/200, 209, 732, 40/781, 201, 202

[56] References Cited

U.S. PATENT DOCUMENTS

| | | | |
|---|---|---|---|
| 1,692,999 | 11/1928 | Siegel | 40/732 |
| 1,758,627 | 5/1930 | Sweitzer | 40/209 |
| 4,182,062 | 1/1980 | Krokos et al. | 40/209 |
| 4,819,355 | 4/1989 | Solow | 40/209 |
| 5,404,664 | 4/1995 | Brooks et al. | 40/209 X |

*Primary Examiner*—Brian K. Green
*Attorney, Agent, or Firm*—Browdy and Neimark

[57] ABSTRACT

A replaceable license plate frame structure including a front frame and a rear frame in which the front frame is inserted. After assembly, the front decorative faces of the front and rear frames are flush with each other and together form a decorative picture or stripe. The rear face of the rear frame is formed with a peripheral dent for receiving a license plate. The front frame is formed with tenons and lugs and the rear frame is formed with corresponding mortises and lugs to engage the front frame, the rear frame and the license plate. Multiple front frame with different decorative front faces can be replaceably assembled with the rear frame so as to vary the pattern of the entire license plate frame structure.

1 Claim, 4 Drawing Sheets

REPLACEABLE LICENSE PLATE FRAME STRUCTURE

BACKGROUND OF THE INVENTION

The present invention relates to a replaceable license plate frame structure including a front frame and a rear frame in which the front frame is inserted plush into the rear frame to form a decorative picture. The rear face of the rear frame is formed with a peripheral dent for receiving the license plate. The front and rear frames are engaged to be burglar proof with each other by tenons and mortises and lugs and screws. Multiple front frames with different decorative front faces can be replaceably assembled with the rear frame so as to freely vary the pattern of the entire license plate frame structure.

PRIOR ART

A conventional license plate frame structure includes two U-shaped lateral frame plates which are replaceable to vary the appearance of the license plate frame structure. A portion of such license plate frame structure between the lateral frame plates is fixed and cannot be replaced so that the appearance of the license plate frame structure can be only limitedly changed.

Moreover, the above frame structure is assembled only by means of tenons and mortises so that it can be easily removed by an unauthorized person.

SUMMARY OF THE INVENTION

It is therefore a primary object of the present invention to provide a replaceable license plate frame structure including a front frame and a rear frame in which the front frame is securely inserted plush into the rear frame to form an integral decorative picture or stripe. Multiple front frames with different decorative front faces can be replaceably assembled with the rear frame so as to freely vary the pattern of the entire license plate frame structure.

It is a further object of the present invention to provide the above license plate frame structure in which the front frame is formed with tenons and lugs and the rear frame is formed with corresponding mortises and lugs for engaging the front frame, the rear frame and the license plate to be burglar proof.

The present invention can be best understood through the following description and accompanying drawings, wherein:

DETAILED DESCRIPTION OF THE PREFERRED EMBODIMENT

Figure 1:
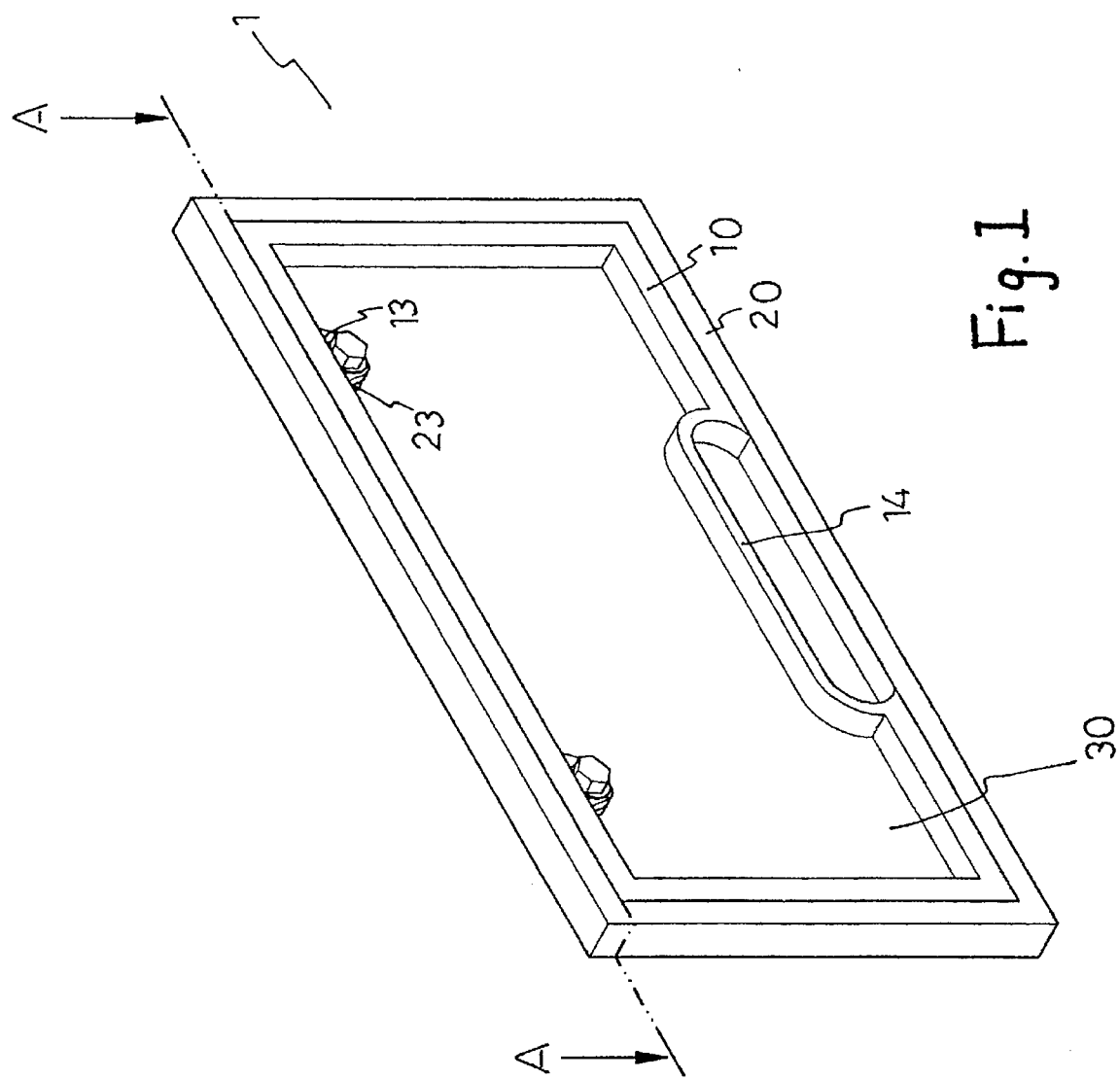
FIG. 1 is a perspective assembled view of the present invention.
Figure 2:
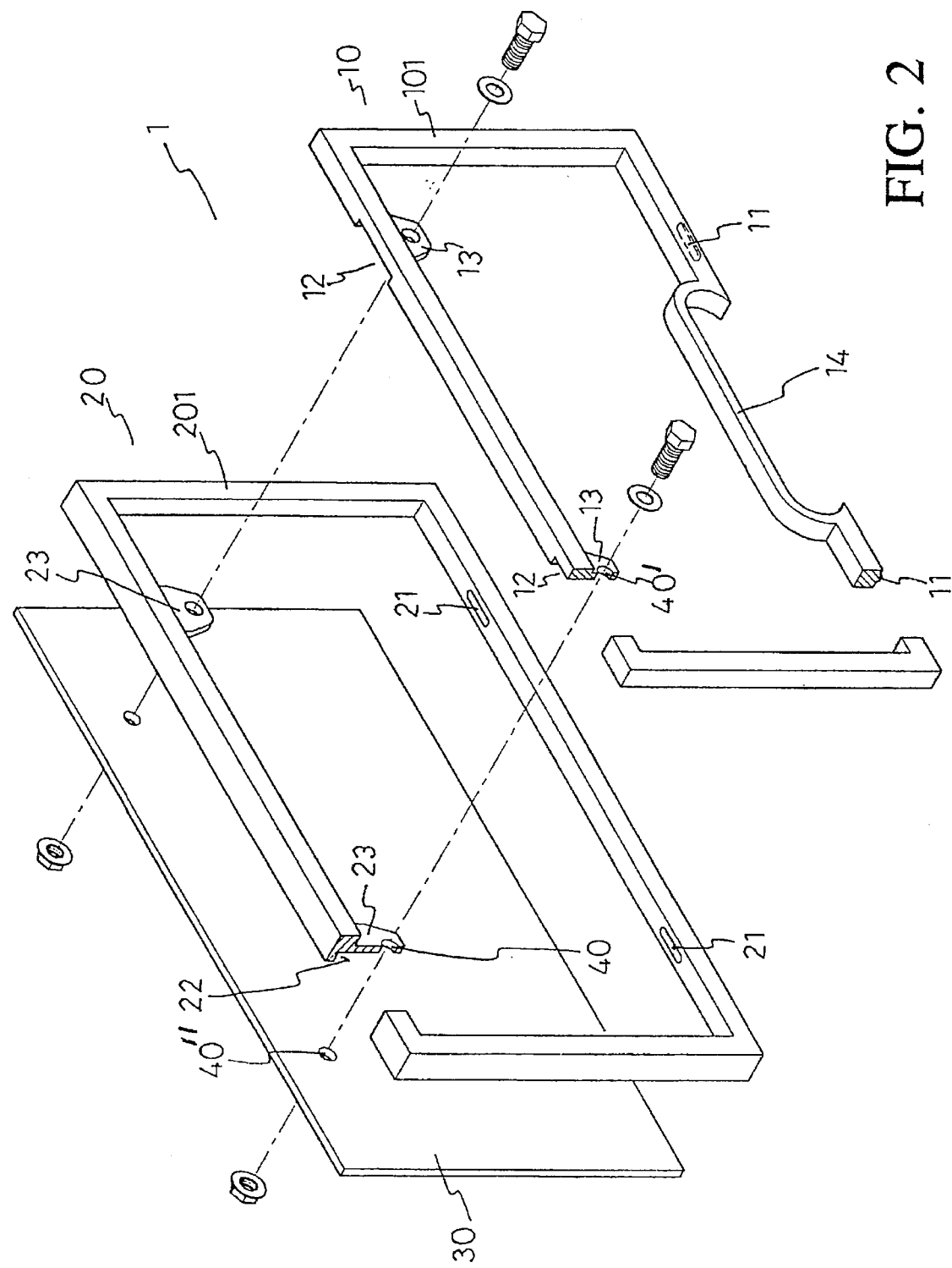
FIG. 2 is a perspective exploded view of the present invention.

As seen in FIGS. 1 and 2, the present invention includes a front frame 10 and a rear frame 20 in which the front frame 10 is inserted. The inner dimension of the rear frame 20 is equal to the outer dimension of the front frame 10 and the front faces (decorative faces) 101, 201 of the front and rear frames are flush with each other after assembled. The rear face of the rear frame 20 is formed with a peripheral dent 22 having a depth equal to the thickness of the license plate 30 for receiving the license plate 30.

Two first lugs 23 formed with thread holes 40 are disposed on upper side of inner periphery of the rear frame 20. The back face of the lug 23 is flush with the inner face of the peripheral dent 22, whereby after the license plate 30 is located in the peripheral dent 22, the front face of the license plate 30 is coplanar to the lug 23 with the thread holes 40 of the rear frame aligned with the thread holes 40" of the license plate 30. Two arch mortises 21 are formed on lower side of inner periphery of the rear frame 20 opposite to the lugs 23.

Figure 4:
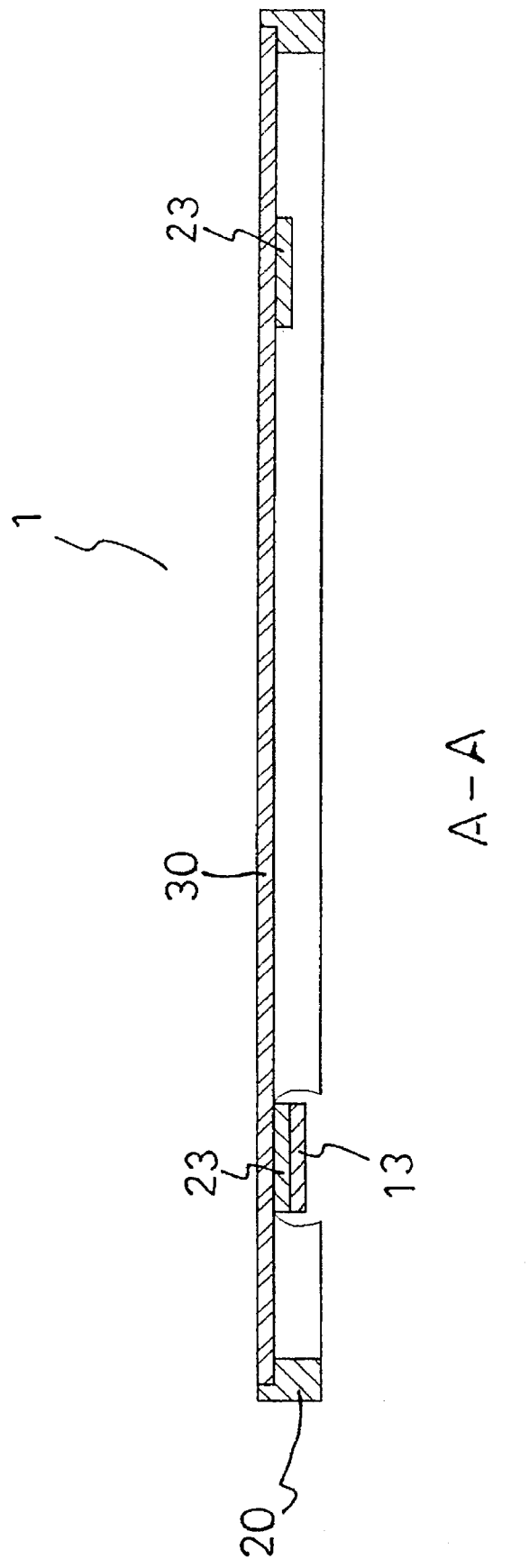
FIG. 4 is a cross-sectional view of the present invention along section A—A of FIG. 1.

The front frame 10 is snugly fitted into the rear frame 20 with the back side of the front frame 10 is planar to the front face of the license plate 30. Referring to FIG. 4, two recesses 12 are formed on the upper side of back face of the front frame 10 in alignment with the lugs 23 of the rear frame. The depth of the recess is equal to the thickness of the lug 23 so as to permit plushing insertion of the front frame into the rear frame. Two shorter second lugs 13 are disposed on the upper side of the inner periphery of the front frame under the recesses 12. The second lugs 13 are formed with thread holes 40" in alignment with the thread holes 40 of the first lugs 23. The back side of the second lug 13 is flush with the inner face of the recess 12.

Two arch tenons 11 are disposed on lower side of inner periphery of the front frame 10 corresponding to the mortises 21 of the rear frame for disengageably engaging the front frame with the rear frame. An arch bridge portion 14 is formed on the lower side of the front frame 10 between the tenons 11.

Figure 3:
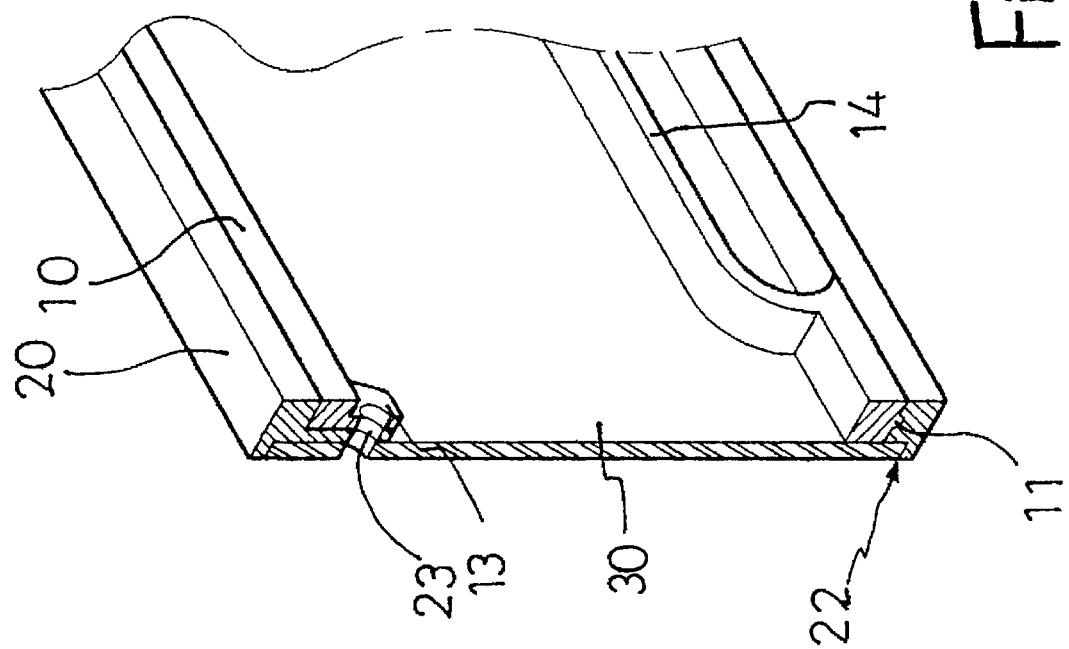
FIG. 3 is a longitudinal sectional view of the present invention.

As seen in to FIGS. 3 and 4, when assembled, the front decorative faces 101, 201 of the front and rear frames 10, 20 are flush with each other and together form a decorative picture or stripe. The upper side of the front frame 10 is inclinedly connected to the corresponding portion of the rear frame 20 and the tenons 11 of the lower side of the front frame 10 are engaged in the mortises 21 of the rear frame 20 so that the second lugs 13 are overlapped on the first lugs 23 as integral lugs with the first lugs 23 fitted in the recesses 12. After the license plate is inserted in the peripheral dent of the rear frame, the thread holes 40", 40, 40' of the front frame, rear frame and the license plate are aligned with each other to be secured at a predetermined position of the car body by screws.

When replaced, the screws are first untightened and the user can pull the front frame 10 upward with hand at the arch bridge portion 14 so as to easily detach the tenons 11 from the mortises 21. Therefore, the front frame can freely replaced.

The above embodiment is only an example of the present invention and the scope of the present invention should not be limited to the example. Any modification or variation derived from the example should fall within the scope of the present invention.

What is claimed is:

1. A replaceable license plate frame structure comprising:
    a rear frame having a rear face formed with a peripheral dent for receiving a license plate formed with thread holes, two first lugs formed with thread holes being disposed on an upper side of an inner periphery of the rear frame, a back face of each of the first lugs being flush with an inner face of the peripheral dent, the rear frame having thread holes aligned with thread holes on the license plate, two arch mortises being formed on a lower side of an inner periphery of the rear frame, a front frame fitted into the rear frame, two recesses being formed on an upper side of a back face of the front frame in alignment with the first lugs of the rear frame, a depth of the recesses being equal to a thickness of the first lugs to permit flush insertion of the front frame into the rear frame, two second lugs being disposed on an upper side of an inner periphery of the front frame under the two recesses, the second lugs having thread holes in alignment with the thread holes of the first lugs, a back side of the second lugs being flush with an inner face of each recess of the two recesses, two arch tenons being disposed on a lower side of the inner periphery of the front frame corresponding to the two arch mortises of the rear frame for disengageably engaging the front frame with the rear frame, an arch bridge portion being formed on a lower side of the front frame between the tenons, whereby when assembled, the front faces of the front frame and the rear frame are flush with each other and the second lugs are overlapped on the first lugs with the first lugs fitted in the two recesses and the two arch tenons of the front frame engaged in the two arch mortises of the rear frame, the license plate being inserted in the peripheral dent of the rear frame with the thread holes of the front frame, rear frame and the license plate aligned with each other to be secured at a predetermined position of a car body by screws.

* * * * *